United States Patent [19]

Yawata et al.

[11] Patent Number: 5,398,305
[45] Date of Patent: Mar. 14, 1995

[54] PRINTER CONTROL DEVICE TO ENABLE PRINTING ON SELECTED MULTIPLE TYPES OF RECORDING MEDIUM

[75] Inventors: Kazunari Yawata; Torao Yajima; Takuya Hyonaga; Yoshikazu Ito; Hiroshi Ono; Kazuhisa Aruga; Noboru Yanagisawa; Mitsuaki Teradaira, all of Suwa, Japan

[73] Assignee: Seiko Epson Corporation, Tokyo, Japan

[21] Appl. No.: 62,977

[22] Filed: May 14, 1993

Related U.S. Application Data

[63] Continuation of Ser. No. 785,355, Oct. 29, 1991, and a continuation of Ser. No. 44,504, Apr. 9, 1993.

[30] Foreign Application Priority Data

Nov. 16, 1990 [JP] Japan ................................ 2-310509
Feb. 13, 1991 [JP] Japan ................................ 3-019841

[51] Int. Cl.6 ............................................. G06F 15/00
[52] U.S. Cl. ..................................... 395/101; 395/115
[58] Field of Search ............... 395/102, 800, 101, 111, 395/112, 115; 358/440, 503; 355/316, 311, 209; 400/120, 56, 61, 708, 568, 625; 346/134, 108, 136

[56] References Cited

U.S. PATENT DOCUMENTS

| | | | |
|---|---|---|---|
| 4,549,302 | 10/1985 | Heatherington | 375/8 |
| 4,793,605 | 12/1988 | Tajima | 400/120 |
| 4,934,845 | 6/1990 | Kato | 400/582 |
| 5,031,116 | 7/1991 | Shukunami et al. | 395/102 |

FOREIGN PATENT DOCUMENTS 228789 7/1987 European Pat. Off. .
312407 4/1989 European Pat. Off. .

OTHER PUBLICATIONS

Deskjet 500 Printer Owner's Manual Appendix C-2, D-2 Hewlett-Packard.

Primary Examiner—Mark R. Powell
Assistant Examiner—U. Chauhan
Attorney, Agent, or Firm—W. Douglas Carothers, Jr.

[57] ABSTRACT

A printer control device is employed with host computer controlled printers, typically of the point-of-sale (POS) type, which are capable of printing on several different types of recording paper. Several detectors are used on the printer to sense out-of-paper conditions with at least one detector being associated with each paper source used, and a detector selection device is used to determine which detector outputs are to be connected to the host computer through a communications interface. Detector output values can be stored and logically combined to allow transfer over a single communications line. Specific detector outputs can be enabled or selected for transfer to the host or for use in termination of printing operations. A paper type selector is used for setting line spacing or advancement amounts which are stored by the printer controller for later retrieval. Typically each advancement value relative to one type of paper is stored separately in a memory location or element. The type of recording paper and line advancement value for that paper are each selected by a printer control command, which is interpreted and acted upon by the printer controller. The printer controller responds to data printing commands and activates paper transfer mechanisms within the printer to achieve the established line advancement values during printing operations.

22 Claims, 9 Drawing Sheets

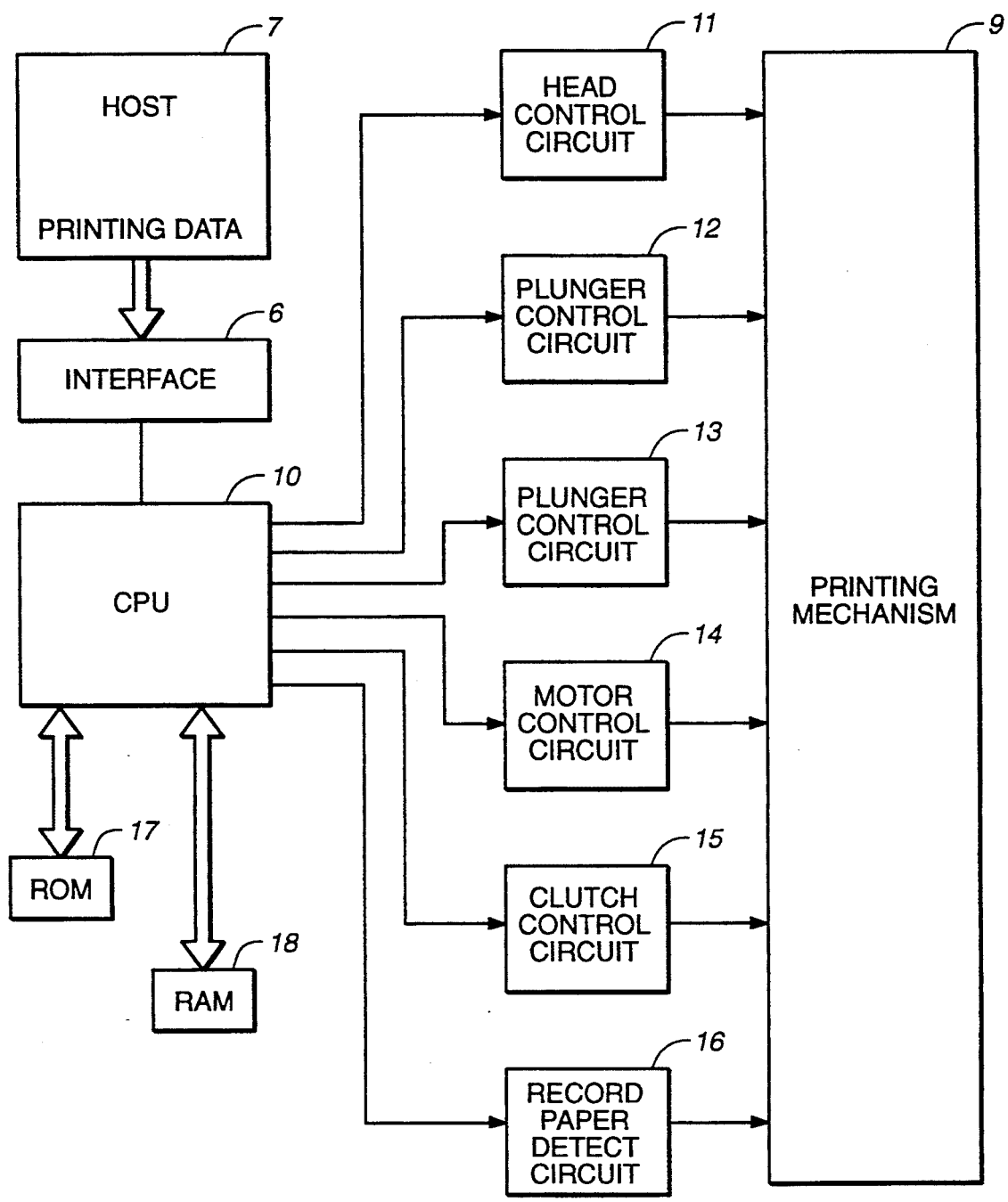
FIG._1

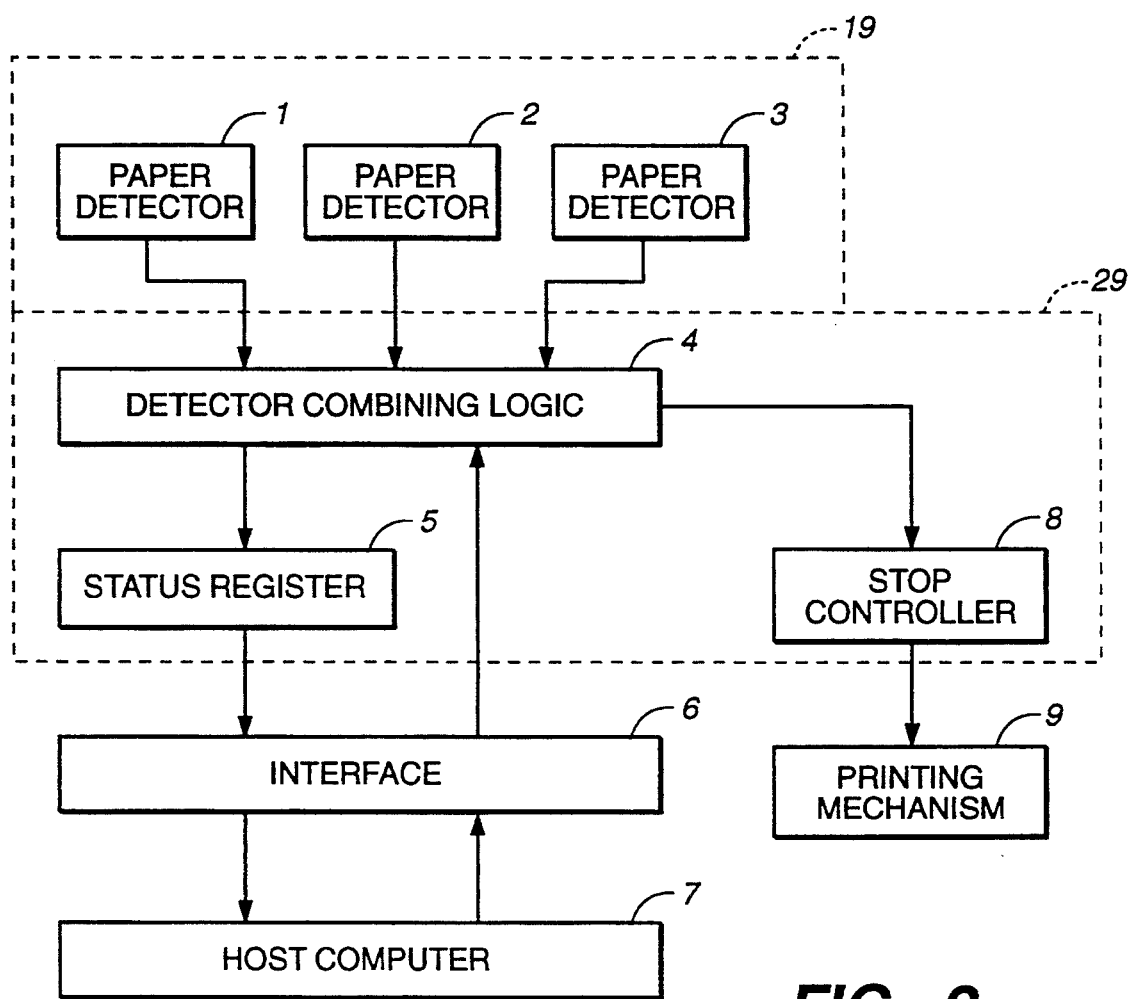
FIG._2
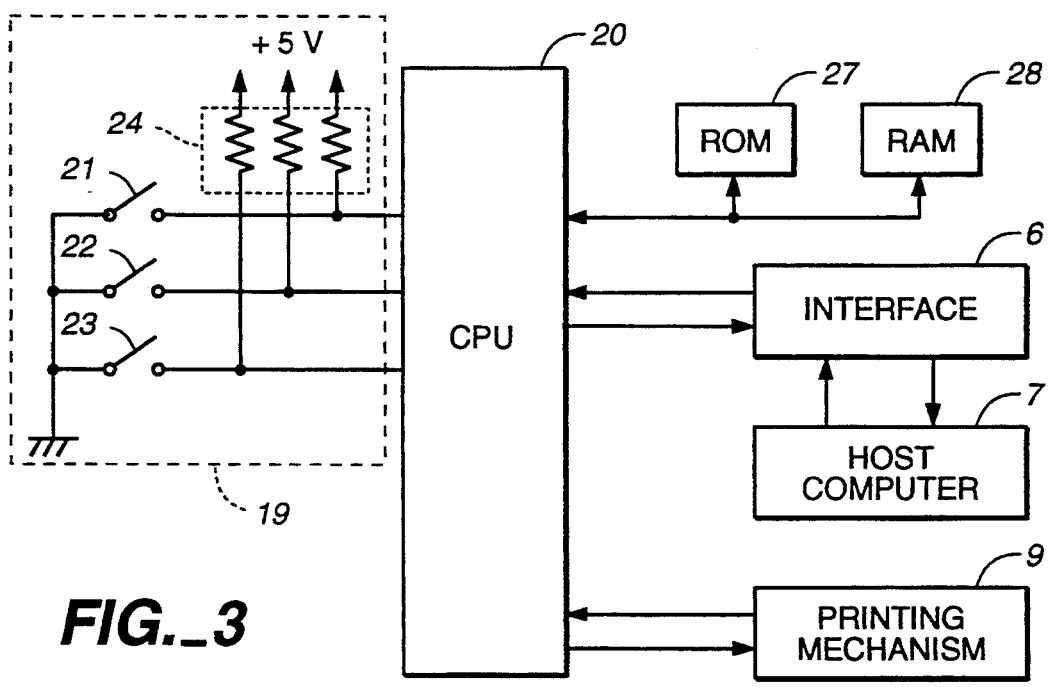
FIG._3

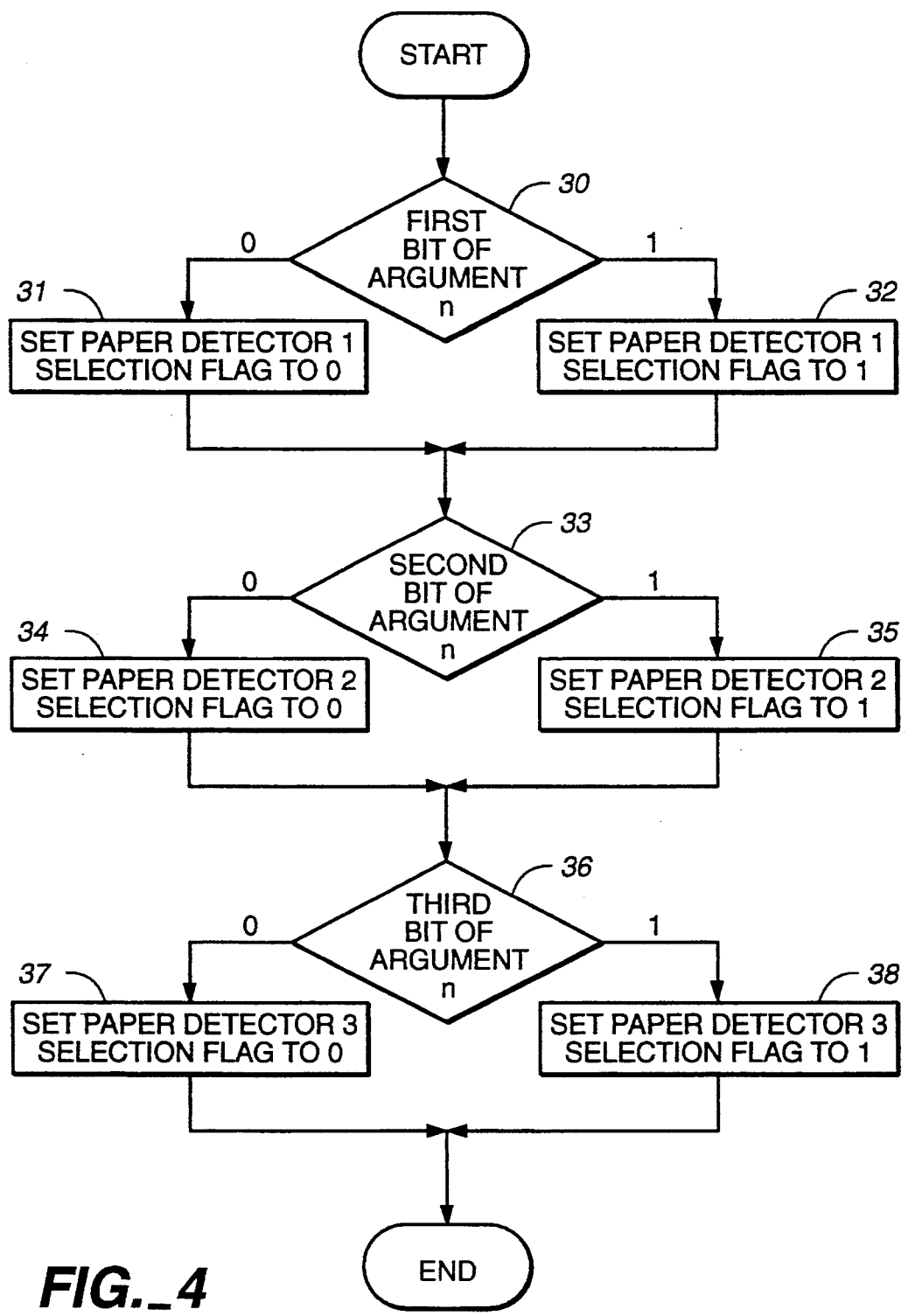
FIG._4

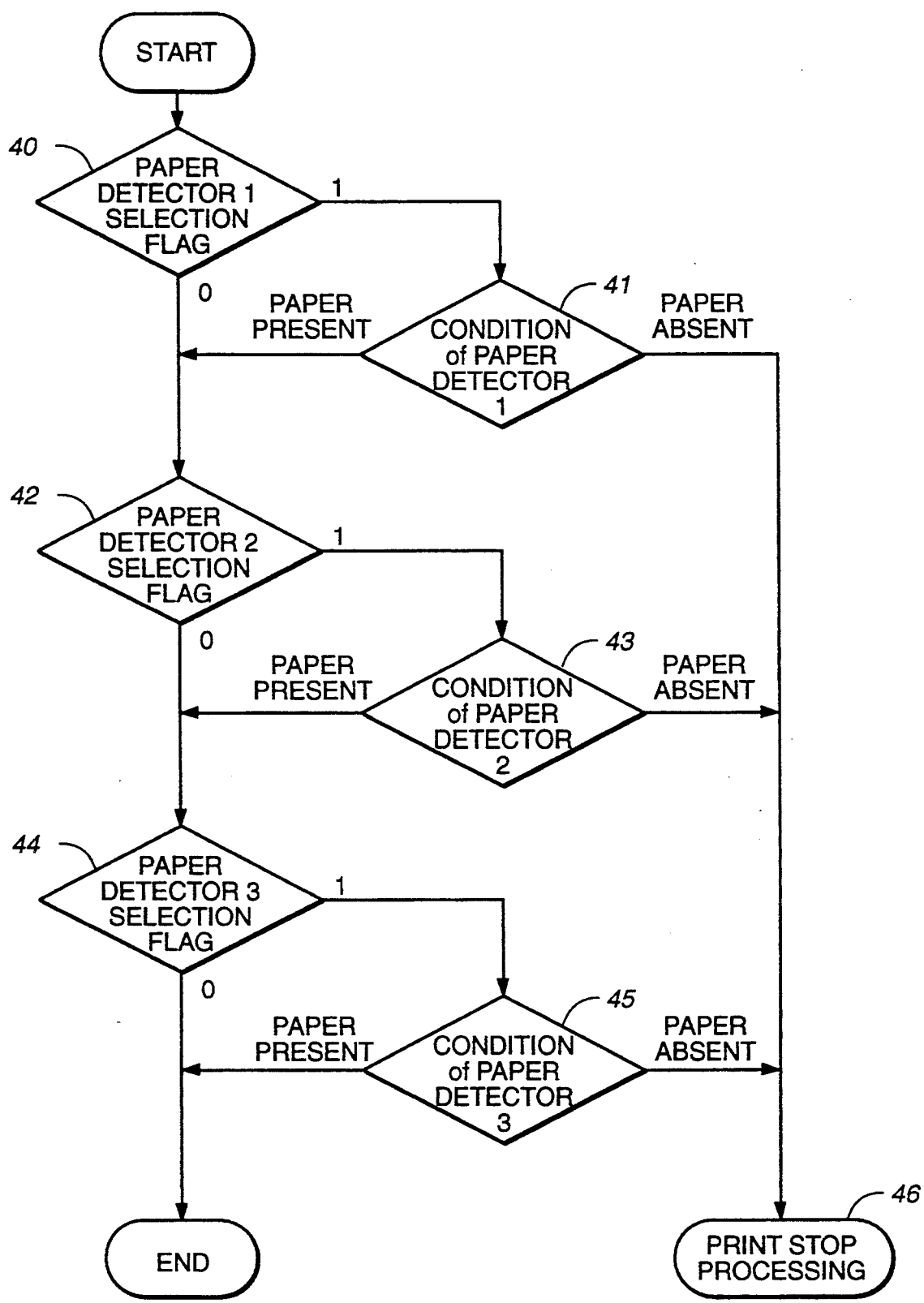
FIG._5

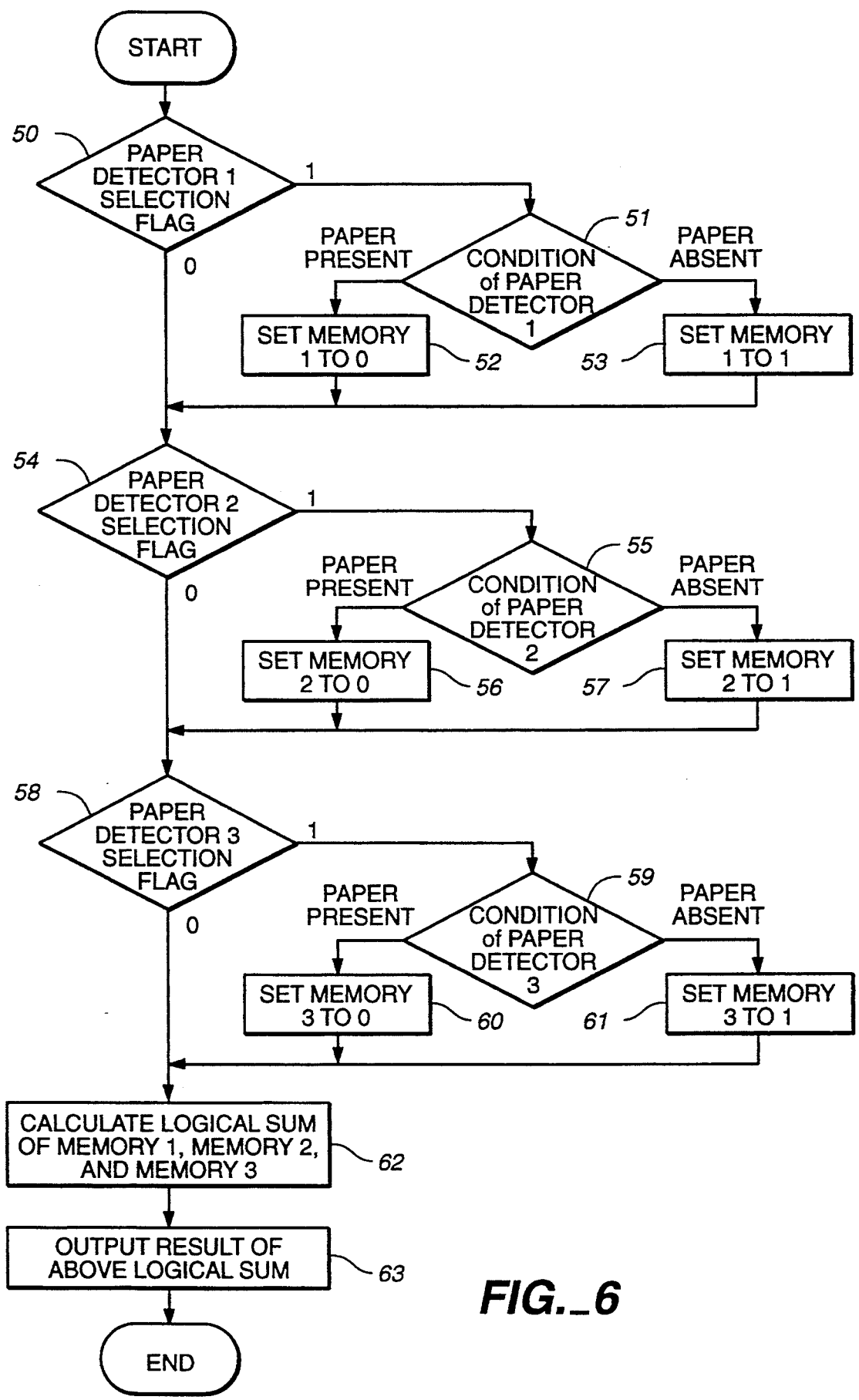
FIG._6

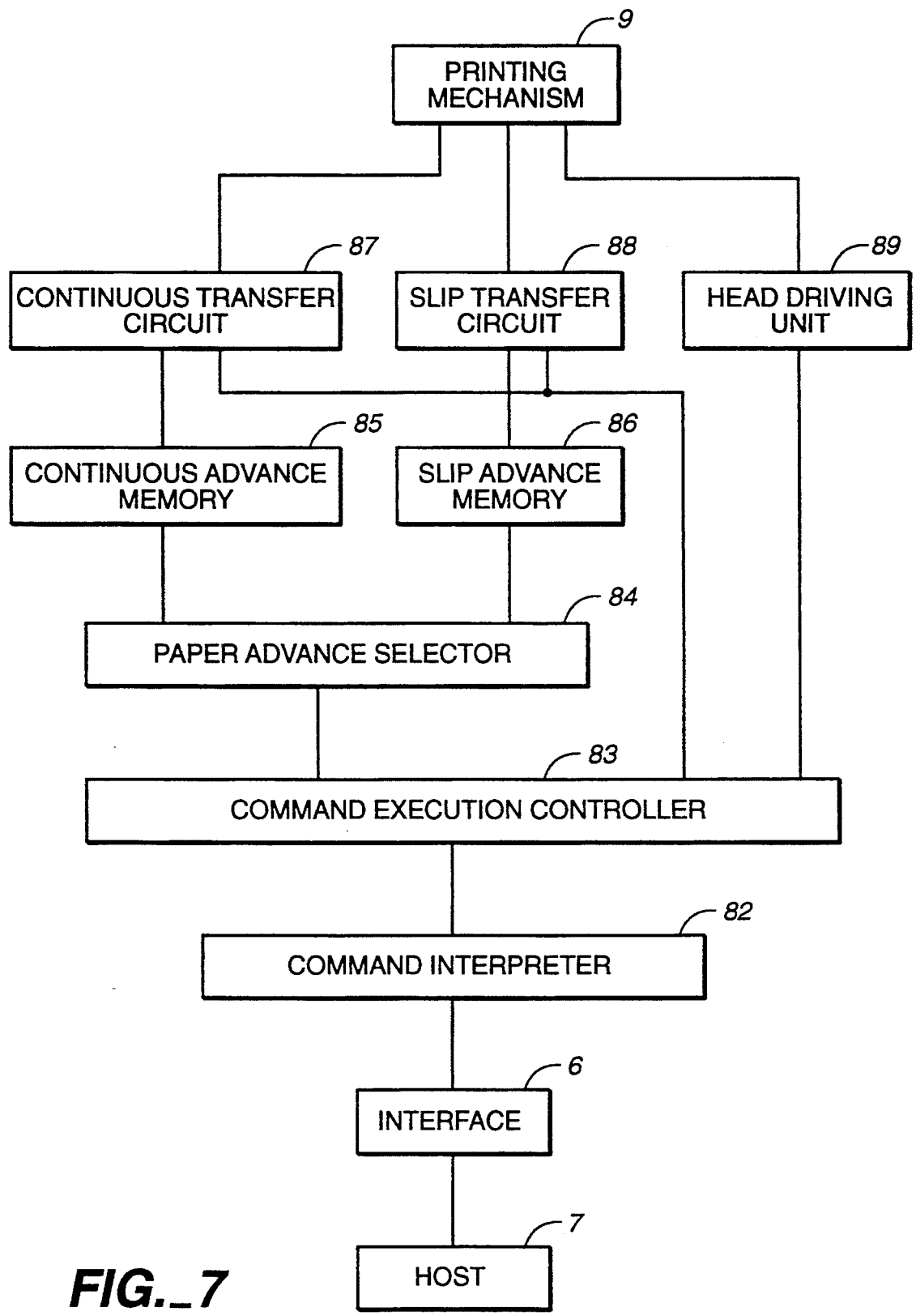
FIG._7

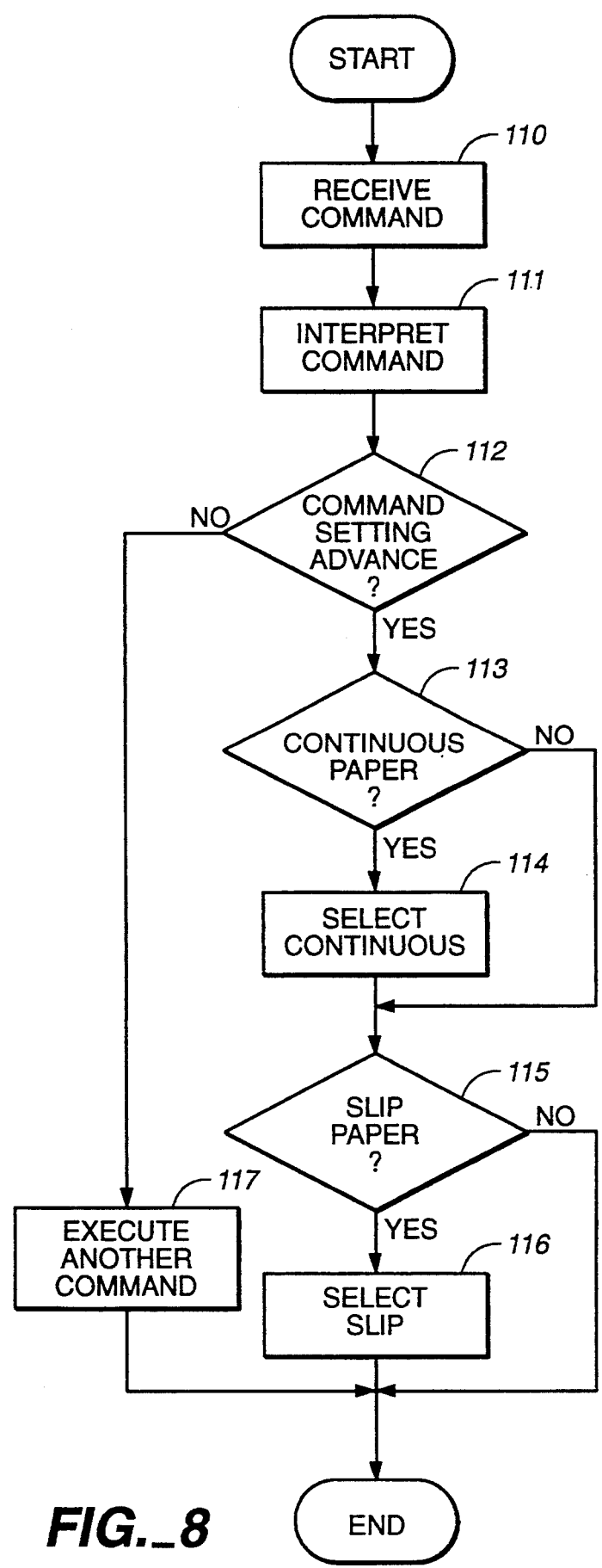
FIG._8

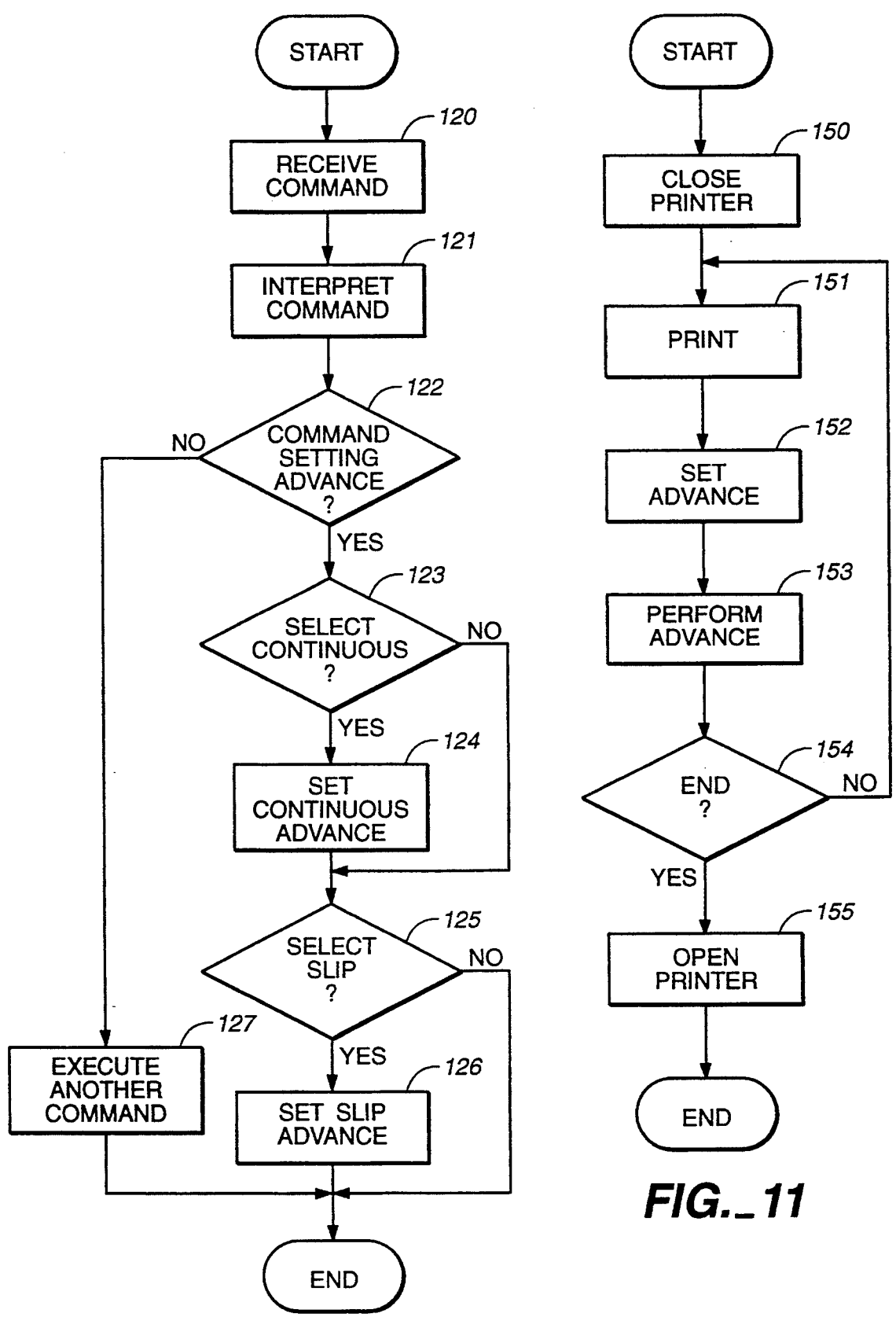
FIG._9
FIG._11

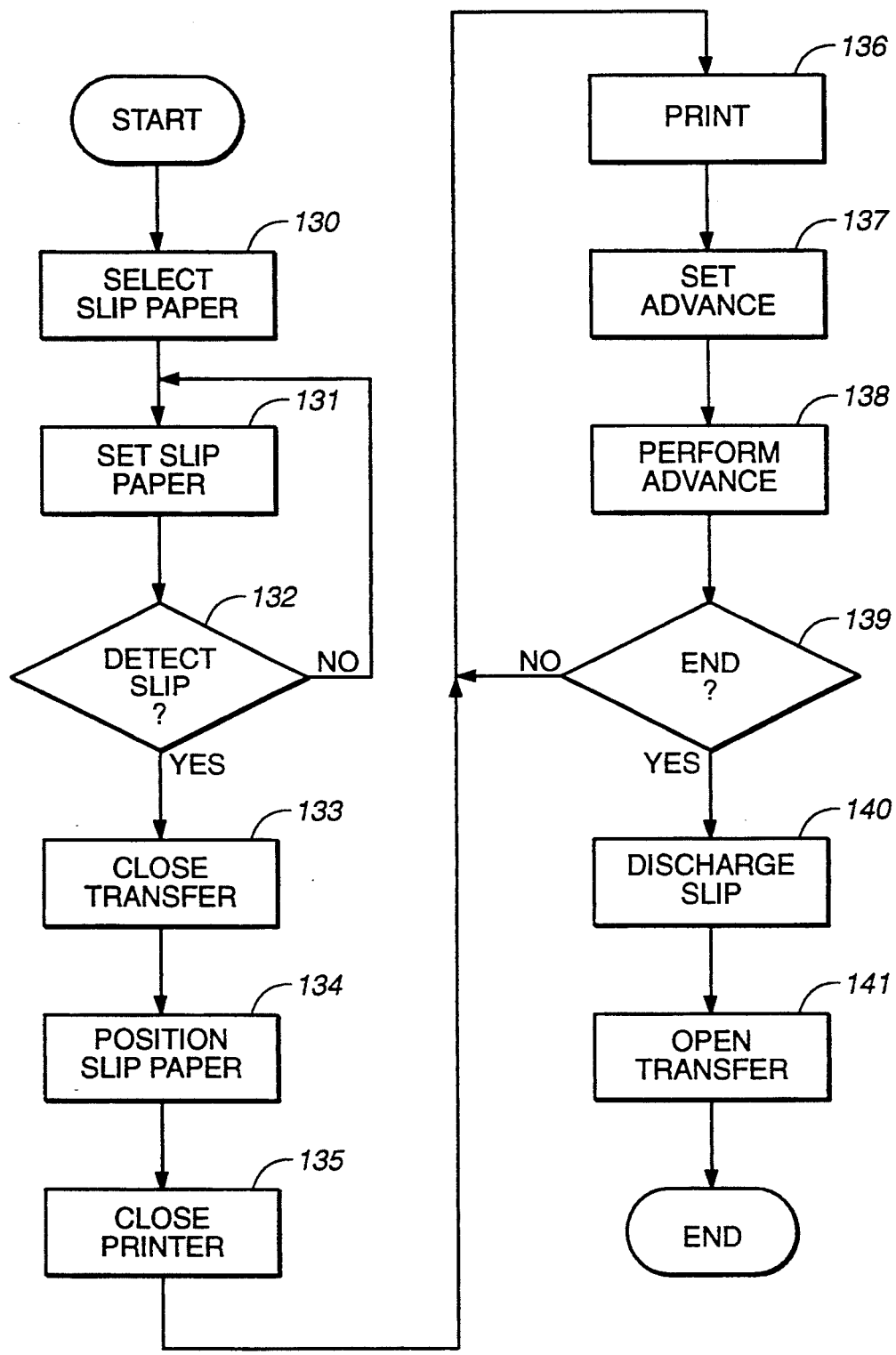
FIG._10

PRINTER CONTROL DEVICE TO ENABLE PRINTING ON SELECTED MULTIPLE TYPES OF RECORDING MEDIUM

This application is a continuation of U.S. patent applications Ser. No. 07/785,355, filed Oct. 29, 1991, and Ser. No. 08/044,504, filed Apr. 9, 1993.

BACKGROUND OF THE INVENTION

1. Field of the Invention

The present invention generally relates to printer control devices for use with printer mechanisms operated by host computers, and more particularly to a method and apparatus for selecting and controlling certain printer processing steps in accordance with the type of recording media present within the printer, especially for multiple paper-type POS printers. The invention further relates to a printer structure that utilizes an efficient command interface to achieve desired printing operations in association with the type of recording medium or paper being used.

2. Related Technological Art

The market for retail store automation equipment is developing rapidly with the widespread introduction of point-of-sale (POS) terminals, even for smaller establishments. Point-of-sale systems have also become indispensable within the distribution of goods and service industries. Centralized and satellite, that is personal-type, computers have been incorporated into such systems to achieve uniform control over output and centralized information tracking functions. This computerization is expected to create increased demand in the future for standardized peripheral devices for point-of-sale and related systems. But a look at the point-of-sale environment as a whole reveals a number of deficiencies which need to be addressed.

Unfortunately, many competing POS-type terminal printers use mutually incompatible interfaces and command structures or language. As a result, the range of applications for POS-type printers and equipment has remained limited and equipment costs relatively high. In response, some methods are being developed to control and check the status of specialized point-of-sale printers using standard or existing computer interfaces.

One such standard interface that has been in use within the personal computer industry for a number of years is the so-called "Centronics" parallel interface. First introduced by the Centronics company, this particular interface has proven very popular, and there is worldwide agreement in the computer industry as to what this interface protocol consists of and how to properly connect to it. Another popular computer interface is the RS-232 serial interface, which is generally employed with computer peripherals such as modems, scanners, or digitizers. Once the most common interface in personal computer printers, the Centronics parallel interface has given way in some areas to faster, more flexible, or higher data transfer rate interfaces of which the SCSI and Appletalk interfaces are examples. However, so-called IBM compatible computers and POS equipment still make heavy use of the Centronics parallel interface. At least one company, Seiko Epson Corporation of Tokyo is promulgating an alternative interface protocol for a parallel interface which is called "ESC/P" or "ESC/POS."

A major problem with the Centronics interface is that it was defined at a time when there was no reason to provide for more than one paper status indication or "paper empty" status signal. Early computer operators simply needed to know whether or not any paper was present. Therefore, a single paper status signal line was provided for on one pin, designated as pin number 12, in a 25 pin standardized electrical connector format, and used to transfer a signal labeled as the "PE" signal, indicating a paper empty condition. The PE signal uses a High logic level output value to indicate when the printer has run out of paper, whenever paper end detection is enabled. Unfortunately, this renders newer POS printers, which can accommodate a variety of different paper types, hard to control because the paper status of each type or source of paper cannot be individually determined. A POS host computer or control system in such a situation is forced to assume recording paper is ready for output, when very often it is not, with deleterious results.

A second problem is that computer or POS-type printers provide limited control over vertical line advance or spacing. POS-type printers have a single memory element or storage location for storing information such as a setting or parameter defining the amount by which paper is to be advanced when changing to print on successive lines of the paper, the so-called line spacing setting. Once a value for line spacing is stored in memory, the stored value is used for whatever type of paper is inserted into the printer until it is reset or changed to a new value. Therefore, it is necessary for the host computer to expend resources tracking the type of paper being used and resetting the line spacing value every time the paper type is changed. This places an increased burden on host computer resources and its communication facilities and detrimentally decreases printing speed.

SUMMARY OF THE INVENTION

In view of the problems encountered in the art, one purpose of the present invention is to provide a printer controller capable of selecting one or more specific print media detectors, in response to commands from a host computer.

Another purpose of this invention is to provide a controller and associated operating method that allows selection of one or more media or recording paper detectors as a signal source for determining when printing should be interrupted, until an indication is received that the paper is ready.

An advantage of the invention is that detector selection, polling, and output are all accomplished using a single data path or signal transmission line between the host computer and the printer, allowing application to the more restricted parallel connections typically in use.

Another advantage of the present invention is that each of several paper detectors can be individually selected using special control commands issued from a host computer.

Another purpose of the invention is to provide the ability for flexible control over the line advance distance or spacing in response to the type of recording paper being used in the printer.

A further purpose of the invention is to provide a printer controller that automatically sets the paper advance amount in response to the type of paper inserted in the printer;

A further advantage of the present invention is that host computer control can be sophisticated beyond prior art levels for more articulate and complex printer control operations.

These and other purposes, objects, and advantages are realized in a printer controller for use with a printer capable of accommodating multiple types of recording media or paper, each being supplied from a different source. The printer is interfaced to a host computer which provides image data to the printer and exercises control over printer operations. The printer is also constructed to use two or more recording paper detectors, a different detector for each type of paper which it is to use, typically at least three, which are positioned on the printer in various locations as required to sense the presence or absence of the various types of paper within the printer mechanism. One or more media transfer mechanisms are used by the printer to independently transfer each of the different types of recording paper through the printer.

The controller uses an interface to communicate with the host computer, which typically uses a protocol, such as the Centronics parallel interface protocol, in which only a single data line is used to communicate paper status. A detector selection device is connected to the interface and to the various detectors so that it receives control commands from the host computer and selects only the output of one or more specified detectors from among the total number of paper detectors for transfer to the host computer, in response to host computer commands.

In a preferred embodiment, a print termination device is coupled to the detector outputs and operates to interrupt printing in response to a predetermined output from paper detectors selected by the detector selection device. An advancement storage or memory device is connected to the media transfer mechanisms and stores advancement values corresponding to each of the types of paper, which represent an amount by which each type of paper is to be transferred when advanced in the printer for a printing operation. The advancement storage memory typically consists of a plurality of separate media advancement memory circuits, one for each type of recording media to be used by the printer.

A command execution controller can be connected to the interface, media transfer mechanisms, and advancement storage device and used to receive and decode control commands, after which it retrieves an advancement value corresponding to a selected paper type, and operates the transfer mechanisms for advancement of the paper type specified by the host computer in accordance with the retrieved advancement value. The command controller can be constructed using a command interpreter, detector selection elements, and other circuits as appropriate.

In further aspects of the invention, the selection device is configured to receive and respond to a first command to select specified detectors for output of status information through the interface to the host computer and respond to a second, independent, command to select from among the paper detectors those for which status output is used to interrupt printing. Generally this is accomplished by detecting and responding to a preselected character string as indicating a command to select only certain outputs of the paper detectors for use in indicating the presence of the appropriate type of print media. A certain amount of data following the command is then decoded as designating one or more individual paper detectors for use.

A status element, such as an addressable latch, can be used to detect and transmit the operating state of each of the paper detectors selected by the detector selection device to the host computer, as well as to enable detector operation in response to host computer commands. A logical combination element may then be connected in series between the status element and detectors for receiving detector outputs and providing a preselected logical combination thereof as a single status output. When using an addressable latch, the host computer can obtain access to the latch contents prior to the occurrence of any printing operations, and test for the presence of the appropriate type of recording paper along pre-designated transfer paths.

During operation of the printer, the detector selection device selectively directs outputs from each of the two or more paper detectors to the interface for transfer to the host computer in response to detector selection commands which it receives from the host computer. The selection process can be accomplished by setting a detector selection flag in a flag storage element for each detector whose output is to be observed by the host computer, detecting the status of each selection flag, and then observing the output of each detector for which a flag is set in a selection state. Each detector output value can also be stored in an output value storage element for each of the observed detectors and then logically combined to provide a single output value.

The detector selection device can be configured to respond to a first command to select specified detectors for output of status information through the interface, and to a second, independent, command to select from among the paper detectors those for which status output is used to interrupt printing. Printing is then interrupted in response to a predetermined output from paper detectors selected by the second command.

A method for controlling the printer involves the steps of receiving and interpreting control commands from the host computer; selecting the type of recording paper for which to set a line advancement value and storing that value in an advance memory. The printing operation for a selected recording paper includes the steps of transferring the selected recording paper to a printing position using the recording paper transfer mechanisms, driving a print head to perform printing, retrieving a line advancement value from advancement memory corresponding to a selected type of recording paper, and directing the media transfer means for to use this value in performing line advances, executing a line advance operation based upon the retrieved advancement value, and repeating the above-steps until printing of data is completed or paper runs out.

According to the above construction and method of operation, the number of paper detectors to be used for determining the presence of paper and terminating printing in the absence of paper is flexibly controlled. In addition, the amount of line advancement or spacing can be set for each type of recording paper and the type of recording paper for which the amount is set can independently be selected. This reduces the burden on the host computer by allowing automatic selection of the advancement amount in response to the type of paper specified. In addition, the printing speed of the printer is increased since the host computer does not have to transmit a control command for setting a line advancement for each printing operation performed with a different type of recording paper.

Other objects and attainments together with a fuller understanding of the present invention will become apparent and appreciated by referring to the following description and claims taken in conjunction with the accompanying drawings.

BRIEF DESCRIPTION OF THE DRAWINGS

FIG. 1 illustrates an overview of a printer controller;

FIG. 2 illustrates a block diagram of a detector input and control circuit for use in the printer controller of FIG. 1, constructed and operating according to the principles of the present invention;

FIG. 3 illustrates a block diagram of an exemplary implementation of the detector combining logic, interrupt controller, and status register functions for the circuit of FIG. 2;

FIG. 4 illustrates a flowchart for operation of the detector combining logic of FIGS. 2 and 3;

FIG. 5 illustrates a flowchart for operation of the interrupt controller of FIGS. 2 and 3;

FIG. 6 illustrates a flowchart for operation of the status register of FIGS. 2 and 3;

FIG. 7 illustrates another embodiment of the printer controller of FIG. 1 in which additional circuit elements are used to control paper transfer;

FIG. 8 illustrates a flowchart for operation of the controller of FIG. 7 after receiving paper line spacing control selection command;

FIG. 9 illustrates a flowchart for operation of the controller of FIG. 7 after receiving paper line spacing commands;

FIG. 10 illustrates a flowchart for operation of the controller of FIG. 7 for printing on slip paper; and FIG. 11 illustrates a flowchart for operation of the controller of FIG. 7 for printing of continuous paper.

DESCRIPTION OF PREFERRED EMBODIMENTS

Various types of recording or printing media are commonly used with point-of-sale (POS) equipment to record a variety of different sales transactions. The various media are principally divided into paper materials of three types: journal or copies for business records, receipts for each customer, and a validation card or slip that is deposited with corresponding credit card companies. In order for businesses to handle an increasing variety of transactions, POS-type printers that accommodate more than one kind of paper, and have multiple paper transfer pathways, have achieve widespread use. Such printers are typically configured to interface to one or more host computers to allow centralized control over printing functions as well as output of computer controlled prices and information.

POS type printers which are useful in implementing the present invention are disclosed in U.S. Pat. No. 5,061,095 and Ser. Nos. 07/791,286 and 08/044,504, which are assigned to the same assignee as the present invention, and which are incorporated herein by reference. The printers illustrated in the these patents are capable of printing on at least two types of recording paper, i.e., continuous and slip types of paper, and are able to transfer each type of paper independently using multiple transfer paths and recording paper transfer mechanisms. However, a different type of control function or controller apparatus must be applied to those printer mechanisms in order to achieve advantages of the present invention.

Printing is such printers carried out on either continuous- or sheet-type paper, or other media, as it is held in place against a platen in front of a print head in the printer. In these printers, one or more drive rollers are mounted on pivoting support arms along a slip paper transfer path and used to transfer slip type paper through the printer mechanism. One drive roller is located near the print head, and a second along another portion of the paper transfer path. These rollers interact with opposing holding rollers to support and move the paper through the paper transfer path. Each pivoting support arm forms part of a slip paper transfer opening/closing mechanism which is typically actuated or articulated using an electrically operated plunger mechanism. A printer opening/closing mechanism may also be used to change the distance between the print head and the platen.

Continuous type sheet paper is transferred from a continuous roll-type paper supply through the printer mechanism using another drive roller positioned near the platen. As before, an opposing holding roller interacts with the continuous paper drive roller to form a continuous paper transfer mechanism to move the paper. A paper guide may be used to assist in directing the continuous paper. The continuous and slip drive rollers and transfer opening/closing mechanisms generally share a common drive source and an element that serves as a transmission member for introduction of motive power.

These printers typically employ an optical sensor as a slip-type paper detector. The detector has an optical axis or path which extends across the paper transfer path and detects the presence of slip paper by optical interruption of the optical path.

A block diagram of a typical printer controller used in operating such printers is shown in FIG. 1. The printer controller shown in FIG. 1 includes an interface 6 through which print data and commands are received from, and information such as paper status is transmitted to, a host computer. For communication with host computer 7, interface 6 is typically configured to follow a standardized communication protocol known to those skilled in the printer art, such as, but not limited to, the Centronics parallel interface. A programmable controller, such as a CPU 10, is connected to interface 6 and is used by the printer controller to operate various circuits and elements that in turn control the operation of each of the various electrical and mechanical sections within a printer mechanism 9. Exemplary control circuits, such as but not limited to, a head control circuit 11, first and second plunger control circuits 12 and 13, for the opening/closing mechanisms, a motor control circuit 14, and a clutch control circuit 15 are illustrated in FIG. 1, and are used to activate and control corresponding elements of printing mechanism 9. A detector circuit 16 is connected to the slip paper detector for detecting the presence of a sheet of slip paper.

A ROM 17 and a RAM 18 are each connected to CPU 10, with ROM 17 being used primarily for storing one or more programs useful in controlling the printer mechanism, while RAM 18 is used for temporary print data or control command storage. Print data is provided as input through interface 6 and temporarily stored in RAM 18, then analyzed by CPU 10, and any character font data corresponding to the received data codes, as required to form an output, is read. A printing operation is then executed by controlling the printer mechanism through motor control circuit 14, head control circuit 11, and one or both of first and second plunger control circuits 12 and 13.

Aside from printing characters or certain graphics data, that is dots to form an image, received from the host computer, the printer also responds to non-printed characters which are used as commands. The non-printing characters are encoded into a specialized protocol structure such as an "escape sequence," as described briefly below.

In the present embodiment, a command protocol designated as the "ESC/POS" command protocol or command set is used to establish a command interface structure for communicating with the printer. In this protocol, printer commands are separated into at least two types or major categories of commands, here referred to as "grade or level" and "sheet" type commands. The level commands are further sub-divided into "basic" and "extension or extended" commands as indicating the relative level of application or sophistication, while the sheet commands are also sub-divided into "single" and "multiple" commands to indicate the paper type being used. Within the various extension type commands there are typically three sub-types of commands, those relating to either mechanical, hardware, or software extensions. The relationship of these commands and the command interface structure is illustrated in Table I in the form of a two-dimensional array.

TABLE I

|  | Single Sheet | Multiple Sheet |
| --- | --- | --- |
| Basic Commands | Single Sheet Commands | Multiple Sheet Additional Commands |
| Extension Commands | Mechanical Extension Hardware Extension Software Extension | |

Tables II through VI are presented below to illustrate typical commands that are used to form the basic and extension level of commands within the ESC/POS command protocol structure. A target printer which is to be controlled, is provided with a unique signal which indicates that a non-printing character sequence which actually comprises a command is being transmitted from a host computer. This is generally accomplished by preceding the main command code by an "ESC" character (1B in hexadecimal notation or 27 in regular decimal notation) which is a commonly used, and well understood, method of signaling the presence of a command code in the computer art. The "ESC" character can be viewed either as a part of the command or as a separate "activation" signal, as desired without effecting the function of the command itself. For purposes of clarity in reviewing the commands, they are presented below with the "ESC" character as part of the command code although not necessary. Characters following the "ESC" character act to identify each particular command and further define its desired function or impact on the printer, as shown by the function column in the tables.

TABLE II

| Basic Single Sheet Commands | |
| --- | --- |
| Code | Function |
| LF | Print and line feed |
| ESC SP | Set character right-side spacing |
| ESC ! | Set print mode |
| ESC * | Set bit image code |

TABLE II-continued

| Basic Single Sheet Commands | |
| --- | --- |
| Code | Function |
| ESC @ | Initialize printer |
| ESC R | Select international character set |
| ESC d | Print and feed paper n lines |
| ESC t | Select character code table |
| ESC { | Set/cancel upside-down character printing |

TABLE III

| Basic Multiple Sheet Commands | |
| --- | --- |
| Code | Function |
| ESC c 0 | Select print sheet(s) |

TABLE IV

| Mechanical Extensions | |
| --- | --- |
| Code | Function |
| FF | Print and eject cut sheet |
| CR | Print and carriage return |
| RS | Journal tab |
| ESC 2 | Set 1/6 inch line spacing |
| ESC 3 | Set minimum line spacing |
| ESC < | Return home |
| ESC C | Set cut sheet eject length |
| ESC F | Set/cancel cut sheet reverse eject |
| ESC J | Print and minimum feed |
| ESC K | Print and reverse minimum feed |
| ESC U | Set/cancel uni-directional printing |
| ESC c 1 | Select paper for setting line spacing |
| ESC c 3 | Select paper detectors to output |
| ESC c 4 | Select paper detectors to stop printing |
| ESC e | Print and reverse feed n lines |
| ESC f | Set cut sheet waiting time |
| ESC i | Execute full cut |
| ESC m | Execute partial cut |
| ESC o | Stamp |
| ESC q | Release |
| ESC r | Select print color |
| ESC z | Set/cancel parallel printing on two sheets |

TABLE V

| Hardware Extensions | |
| --- | --- |
| Code | Function |
| ESC BEL | Buzzer ON/OFF |
| ESC c 5 | Enable/disable panel switches |
| ESC c 6 | Enable/disable ON-LINE switch |
| ESC p | Generate pulse |
| ESC v | Transmit printer status |
| ESC ~ | LED ON/OFF |

TABLE VI

| Software Extensions | |
| --- | --- |
| Code | Function |
| HT | Horizontal tab |
| ESC % | Set/cancel user-defined character set |
| ESC & | Define user-defined characters |
| ESC D | Set horizontal tab positions |

It should be clearly apparent that several of these commands will be followed by one or more bytes of data to indicate values for the command argument or arguments. That is, some of the commands initiate a certain task, such as paper advancement, which is followed by a specific value to indicate the execution factor for the command, such as how many sixtieths of an inch, etc. In addition, the above commands are not the only commands that can be configured for use with the apparatus and method of the present invention but present a highly efficient command structure that is readily understood by those skilled in the art, and is very useful for illustrating the operation of the invention.

Returning to the apparatus of the invention, a block diagram of the detector controller portion of a printer controller operating according to the principles of the present invention is shown in FIG. 2. In FIG. 2, the detector circuit or array 19 incorporates a journal paper detector 1, a receipt paper detector 2, and a slip paper detector 3. Each of the paper detectors 1, 2, or 3 is configured or positioned to detect the status of a particular type of recording paper, and provide a corresponding status output signal. That is, one is used :for continuous paper, one for slip paper, and one for validation paper. It will be readily apparent to those skilled in the art that additional detectors can be used, as well as fewer, depending upon the amount of control desired for specific applications and any volumetric constraints.

A detector combining logic element 4 is connected to the respective outputs of detectors 1, 2, and 3, and produces various logical combinations of one or more of the paper detector outputs to generate a single output signal for transfer by interface 6. The specific logical combinations used by element 4 are command programmable and are selected in response to control commands previously received through interface 6 from host computer 7, or from internal ROM or RAM memory. An interrupt or stop controller 8 is generally connected to receive an output from logic element 4, and is configured so that it can interrupt or halt printing in response to an output from any of appropriately enabled paper detectors 1, 2, or 3. A status register 5, or similar status detection and storage device, is also connected to receive a signal from each enabled paper detector. Host computer 7 can poll or read the status of each enabled detector by reading the contents of register 5 using interface 6. Logic element 4, status register 5, and stop controller 8 form a detector controller or control circuit 29, which replaces or supplements circuit 16 shown in FIG. 1.

An exemplary mechanical extension command, "ESC c 3," is selected from the command tables presented above, and used for instructing the printer as to which of the paper detectors are to be enabled for purposes of checking the presence of recording media or paper. The "ESC" character indicates that a command is to follow, and the characters, "c 3," indicate that the command is one that designates which detectors are to be used. This command structure is then followed by one byte of data representing a command "argument," typically indicated as a fictitious value "n", so that the entire command structure (including ESC) employs four bytes of data, transferred in series as: 1BH, 63H, 33H, and the value for n (where H signifies hexadecimal notation).

Each of the eight bits used to form the command argument "n," represent a predefined function, although some bits may remain unused in some specific applications. That is, each bit is used to establish a value for designating detectors. An exemplary encoding/decoding scheme found useful in implementing the "ESC c 3 n" command is shown in Table VII below. This predefined bit-to-function mapping or series of relationships are then used by the printer controller to decipher, interpret, or decode commands in order to establish the appropriate hardware connections and processing of detector data.

This command extension selects which of the paper detectors to output onto the paper-end (PE) status line (pin 12). This selection remains valid until changed by subsequent controller or host computer commands. Each of the eight functions is also independent of the others. For example, paper detection for journal and receipt recording papers near their respective ends can be both OFF (bits 0 and 1 LOW), the journal-near-end ON (bit 0 HIGH), the receipt-near-end ON (bit 1 HIGH), or both journal-near-end and receipt-near-end ON (bits 0 and 1 both HIGH).

TABLE VII

| Bit | Function | bit=0 | bit=1 |
| --- | --- | --- | --- |
| 0 | Journal-near-end | disabled | enabled |
| 1 | Receipt-near-end | disabled | enabled |
| 2 | Journal | disabled | enabled |
| 3 | Receipt | disabled | enabled |
| 4 | Slip top-of-form | disabled | enabled |
| 5 | Slip bottom-of-form | disabled | enabled |
| 6 | Validation top-of-form | disabled | enabled |
| 7 | Validation bottom-of-form | disabled | enabled |

When more than one detector or detector output is enabled at one time in this arrangement, their outputs are logically combined using an OR function and then presented on the single communication line of interface 6. However, various logical operations can be employed as desired, especially where many more detectors are employed in various combinations. When selecting multiple detectors or multiple detector outputs, even if only one paper detector provides an output indicating that no paper is present, a paper-end signal is output to the host computer. Those skilled in the art will readily appreciate that the timing for selected detector output signals indicating printer or paper status differs depending on the particular printer model.

An exemplary mechanical extension command "ESC c 4" is used to select which of the paper detectors are to be used as a basis for interrupting printing. That is, a separate command can be used to select which detector outputs are valid for printing control versus the command described above for determining which detector outputs are polled for determining the presence of paper. The "ESC c 4" command is followed by a byte "n" of data for the command argument, so that four bytes are sent in a row: 1BH, 63H, 34H, and n (H signifies hexadecimal notation). Each of the eight bits used to form the command argument "n" has a function, as shown in Table VIII. This extension selects which of the paper detectors are to be used to stop printing, and this selection remains valid until changed by a subsequent command.

TABLE VIII

| Bit | Function | bit=0 | bit=1 |
| --- | --- | --- | --- |
| 0 | Journal near end | disabled | enabled |
| 1 | Receipt near end | disabled | enabled |
| 2 | Journal | disabled | enabled |
| 3 | Receipt | disabled | enabled |
| 4 | Slip top-of-form | disabled | enabled |
| 5 | Slip bottom-of-form | disabled | enabled |
| 6 | Validation top-of-form | disabled | enabled |
| 7 | Validation bottom-of-form | disabled | enabled |

The number and type of detectors used in Table VIII are only exemplary of those useful for POS type printers. The value of n for the "ESC c 4" and "ESC c 3" commands can typically range from 0 to 255. This provided for a significant number of independent designations for detectors, and paper or from types which can be accommodated within a POS system serving a variety of POS printers and functions.

When a paper-end detector is enabled, printing will not be stopped or interrupted unless the corresponding type of paper is also selected as the print media or in this case sheet of paper. Selecting more than one detector as the source of information for effecting interruption of the printing process, causes printing to cease if any one of the enabled detectors sense that no paper is present. This latter operation is generally realized by having logic element 4 use a logical OR operation to process enabled detector outputs.

However, printing will be automatically interrupted after each line of printing is completed and the paper is advanced to another line. When an end of the paper currently in use, or a "paper-end" condition, is detected by a journal or receipt detector, the printer is directed to change to an "OFF-LINE" mode or status after any current printing operation ends. This mode is selected since it is reasonably assumed that a lack of paper means that no further information is to be printed at this time.

When a paper-end condition is detected by any cut sheet paper-end detector, printing operations continue until printing for the current cut sheet is completed and that sheet is ejected from the printer. The printer then waits for another cut sheet to be loaded into the printer mechanism. This operating mode is used to account for the separation of the paper-end detector and the paper margin, as well as the fact that an end to one sheet of single sheet format paper does not automatically signal the end of a printing task.

One method for implementing the detection circuitry of the printer controller as shown in FIG. 2 is illustrated in FIG. 3. In FIG. 3, detector circuit 19 comprises a set of three switches 21, 22, and 23 which correspond to paper detectors 1, 2, and 3, respectively. A resistor network 24 is typically used to pull-up the signal line outputs for each of the switches when their contacts are open or they are in an opened state. Switches 21, 22, and 23 can be implemented using mechanical switches, such as micro-switches or open-collector outputs of photodetectors that interact with the recording paper. However, those skilled in the art will readily appreciate that other types of detectors may also be used within the teachings of the present invention. When using photodetectors, the interruption of an optical path by paper present in an appropriate transfer path, causes the output of the detector to change from High to Low, or the reverse as desired. Paper detector switches 21, 22, and 23 are generally of the normally open type, which means that they provide a high logic level output (due to pull-up resistor network 24) when no-paper is being sensed. That is, when no paper is present to activate or "close" the switch.

A microcomputer based printer controller 29, receives signals from paper detector switches 21, 22, and 23, and interprets commands received from a host computer 20. Microcomputer controller 29 functions to select particular paper detectors in response to control commands transferred from the host computer, sense paper detector outputs, halt printing based on the status of the selected paper detectors, and report the paper detection status to host computer 7. In this implementation, controller 29 comprises a CPU 20 connected to a ROM 27, and a RAM 28, and implements the functions of detector combining logic 4, stop or interrupt controller 8, and status register 5 shown in FIG. 2. Interface 6 is used as discussed previously for communications occurring between host computer 7 and CPU 20. Printing mechanism 9 represents the remaining functional parts of a standard POS type printer. However, CPU 20, ROM 27, and RAM 28 shown in FIG. 3 can also be implemented using CPU 10, ROM 17, and RAM 18 in the printer controller of FIG. 1.

Print controller 29 is employed to establish certain preselected operating conditions for operation of the printer. The print controller is used to: select: paper type and print line spacing; a combination of paper detector outputs to be polled; a combination of paper detector outputs to use in determining when to stop printing; and to transmit printer and/or detector status to a host computer. In addition, the print controller is also configured to provide control over several other printer operations such as: settings for minimum line spacing; cut sheet ejection length; cut sheet reverse ejection; printing and minimum feeding; printing and reverse minimum feeding; uni-directional printing, printing and reverse feeding "n" number of lines; waiting time for cut sheet insertion; horizontal tab position; or for executing a full cut; executing a partial cut; stamping; releasing; print color; parallel printing on two sheets; turning a buzzer ON/OFF; enabling or disabling panel or ON-LINE switches; turning an indicator LED ON/OFF; setting/canceling a user-defined character set; defining a user-defined character; and returning the print head carriage to a home position. Various portions of the printer controller are responsive to the commands listed in Tables IV, V, and VI shown above, which direct the printer to execute the various operations listed.

A printer operating procedure, or series of steps to be executed by the printer, as requested by a host computer or operator is generally stored in ROM 27 (17). The instructions or steps stored in ROM 27 typically represent certain software based procedures for performing certain functions on the printer, and may form a firmware based procedure for interpreting control commands. At the same time, RAM 28 (18) is used to store any flags used to interrupt or further control printer operations, as well as any transient data used by CPU 20 (10) to effect operations.

A flowchart of processing steps or operations useful for enabling and disabling paper detectors 21, 22 and 23 is illustrated in FIG. 4. Some of the steps illustrated in FIG. 4 would typically be implemented as part of a host-computer controlled process. As stated above, a byte "n" received as part of either an "ESC c 3 n" or "ESC c 4 n" command sequence is used to indicate certain argument values for these commands. The various bits in this byte of data are used to establish or set flags to indicate the operating status of the detectors used in the printer.

Therefore, in a step 30 the first bit of byte "n" is tested or checked to determine its value and if it is zero, a first detector selection flag (flag one for detector 1) is reset or set low to "0" (LOW) in a step 31. Otherwise, the first detector flag is set high to "1" (HIGH) in a step 32. The second bit of byte "n" is then tested in a step 33, and if its value is zero, a second detector selection flag (flag two for detector 2) is reset low to "0" (LOW) in a step 34. Otherwise, the second detector flag is set to "1" in a step 35. The third bit of byte "n" is then tested in a step 30, and if it is zero, this third flag is reset low to "0" (LOW) in a step 37. Otherwise, the third detector selection flag is set high to "1" in a step 38. The process then terminates and control returns to the host computer. Of course, if additional detectors are employed, then additional polling and determination steps are added as well as additional status or selection flags. In addition, those skilled in the art will recognize that the opposite or reversed logic levels can be employed within the teachings of the invention as desired.

A process or procedure for managing print stop or interrupt controller 8 is shown in flowchart form in FIG. 5. In FIG. 5, the processing commences by polling or testing the first detector selection flag in a step 40. If it is determined in step 40 that this first flag is set, then paper detector 21 is read or checked in a step 41. Otherwise, operation proceeds to a step 42. If during the execution of step 41 it is determined that paper is absent or not detected in the printer mechanism, operational processing proceeds or branches to a step 46.

In step 42, the current status of the second detector selection flag is checked or tested. If the second detector flag is in a set state, the output or state of paper detector 22 is read in a step 43. Otherwise, processing proceeds to a step 44. If it is determined in step 43 that paper is not present, or in other words is absent, control proceeds or branches to a step 46. In executing the operations of step 44, the current status of the third detector selection flag is tested or determined. If the third detector flag is in a set state or mode, paper detector 23 is polled or read in a step 45. Otherwise, processing returns control to the host computer and this procedure ends. If, on the other hand, it is determined during step 45 from the output of detector 23 that paper is absent, processing proceeds or branches to step 46, where printing is interrupted or stopped.

Another flowchart is presented in FIG. 6 which represents a third control procedure that can also be implemented using the microcomputer based controller described above. In this control procedure, the first detector selection flag is tested in a step 50. If the first detector flag is not in a set state, in other words has a zero value or level, control processing proceeds to a step 54. Otherwise, processing proceeds to a step 51 were the output or status of paper detector 21 is tested or determined. If the output of detector 21 indicates that paper is present, a value of zero is assigned to or stored in a first memory location, such as in RAM 27 in a step 52. If paper is not present, a value of one is stored in the first memory location in a step 53. The second detector selection flag is tested in a step 54, and if this flag is in a reset state, or zero, control processing proceeds to a step 58. Otherwise, paper detector 22 is tested or polled in a step 55. If the output of paper detector 22 indicates that paper is present, a value of zero is stored in a second memory location, such as within RAM 27, in a step 56. If, on the other hand, paper is not present, a one is assigned or stored in the second memory location in a step 57.

The third detector selection flag is tested in a step 58, and if reset or zero, control operation proceeds to a step 62. Otherwise, the output of paper detector 23 is tested or polled in a step 59. If the output of detector 23 indicates that paper is present, a third memory location is set equal to zero in a step 60. If paper is not present, one is stored in the third memory in a step 61. The first through third memories or memory locations are then logically combined in a step 62, and the result is provided as output in a step 63. This output can be provided to the host computer say, for example, using the PE signal, line 12, on interface 6.

The flowcharts appearing in FIGS. 4, 5, and 6 illustrate embodiments of the invention which employ three paper detectors. However, it will be apparent to those skilled in the art that the present invention need not be limited to this number of detectors and that more or fewer detectors can be used within the teachings of the invention.

Another embodiment for the printer controller of FIG. 1 in which additional circuit elements are employed to effect control over line spacing and paper advancement is shown in FIG. 7. In FIG. 7, one or more control commands are supplied to interface 6 by host computer 7, as described before, and transferred to a command interpreter or analyzer 82 where they are analyzed or decoded to determine the nature of the command and any associated command arguments or modifiers. Once detected and decoded, or otherwise analyzed, printer control commands are transferred to a control command execution unit or controller 83 for implementation. Command execution controller 83 is constructed so that it provides signals as required to operate or activate certain portions of printing mechanism 9, head driving unit 89, and slip and continuous transfer control units 87 and 88, in accordance with the particular commands being received.

Continuous transfer units 87 corresponds in part to plunger control circuit 12, which operates the continuous paper transfer opening/closing mechanism in the printer, motor control circuit 14, and clutch control circuit 15 shown in FIG. 1. Slip transfer units 88 corresponds in part to plunger control circuits 12 and 13, which operate the slip paper transfer opening/closing mechanisms in the printer, motor control circuit 14, and clutch control circuit 15 shown in FIG. 1. Transfer units 87 and 88 control the transfer or advancement of continuous and slip paper, respectively, by controlling the continuous paper and slip paper transfer mechanisms, previously discussed above, generally by activation of the appropriate plungers and operation of the motor to rotate one or more drive rollers.

Continuous transfer units 87 controls the continuous paper transfer mechanism in accordance with a line return or advancement value stored in a continuous advance memory 85. Slip transfer units 88 controls the slip paper transfer mechanisms based upon a line return or advancement value stored in a slip advance memory 86. Each of the memories 85 and 86 have their respective contents set by command execution controller 83 through a paper advance selection circuit or selector 84. Selector 84 is used by execution controller 83 to set the amount of line advancement or distance, including negative as desired, by which the printer advances a sheet of paper vertically.

Line advancement can be viewed as a vertical distance along the paper, typically defined in terms of the product of an advancement factor and a minimum unit of measure or vertical advancement. Typical minimum vertical units or distances by which motor drive mechanisms can advance paper are on the order of one three-hundred-and-sixtieth (1/360) to one sixtieth (1/60) of an inch, although printer designs can accommodate other measurements, such as 1/6, 1/144, 1/240, etc. Therefore, each line advancement value "l" represents a quantity of minimum vertical advancements, such as in 1/60 or 1/240 inches, where l is selected to be within a predefined range of values such as $0 \leq l \leq 255$. In the alternative line advancement can be defined in terms of the number of horizontal rows of printing dots or dotlines created during printing, when using a dot-matrix type of output pattern.

An exemplary mechanical extension command "ESC 3 n" is illustrated in command Table IV above, as being useful for instructing the printer to set line spacing at a desired value. As before, the "ESC" character indicates that a command is to follow, and the character "3" indicates that the command is one that designates line spacing. This command structure is then followed by a command argument, as indicated by the fictitious value "n", which specifies the number of minimum units by which the paper is to be advanced. In this example, n is replaced by the value chosen for 1 above.

When this command is used for setting line spacing to n/240 of an inch then "n" would be 40 (28 in hexadecimal) if the desired line advancement amount is 1/6 inch. In this case, the command code is provided as "1BH 33H 28H". Therefore, if the advance value for continuous paper is set to 1/6 (40/240), then the command and argument code sent to the printer would be "1BH 33H 28H".

Selector 84 loads or reads the desired values for continuos paper advancement and slip paper advancement into the respective memories for use by the printer controller when each type of paper is selected for printing. That is, each memory 85 and 86 establishes the line advance value that is used by the respective paper transfer circuit when that transfer circuit is activated under control of the command execution controller. Therefore, paper advance distance is automatically selected or determined for each type of paper as the paper is selected for use, fleeing host computer resources from monitoring this task.

The control apparatus of FIG. 7 can be realized by using CPU 10 of FIG. 1 (20 of FIG. 2) as command interpreter 82, command execution controller 83, and paper advance selector 84 in cooperation with ROM 17 (27) and RAM 18 (28). Advance amount memories 85 and 86 are realized by using RAM 18 (28) under control of CPU 10 (20).

A flowchart of processing steps or operations undertaken by the printer after receiving commands for controlling paper advance selector 84 is presented in FIG. 8. In FIG. 8, a control command is received through interface 6 in a step 110 and interpreted by command interpreter 82 in a step 111. A determination is made in a step 112 as to whether or not the received command includes information for controlling paper selector 84 (such as ESC c 1). If the command does not include information for controlling the paper selector 84 (Step 112), the command is executed in some other fashion as another type of command to be executed in a step 117 and processing for paper advance selection ends until another command is received.

Otherwise, if the command designates a paper advancement selection, processing proceeds to a step 113 where a determination is made as to whether or not the command designates continuous paper as the basis for establishing the desired amount of paper advancement. If continuous paper is designated by the command, then continuous paper is selected in a step 114 as the type of line advancement setting. If the command does not designate continuous paper then a determination is made in a step 115 as to whether slip type paper is being designated. If slip paper is designated by the command, then slip paper is selected as the type of paper for the advancement setting in a step 116. If neither continuous or slip paper is detected during the processing of steps 113 and 115 it is assumed that an erroneous designation was detected in step 112, and processing for paper advancement terminates. In the alternative, processing in step 113 can determine if either slip or continuous paper is being designated in a single step and then direct the selection process accordingly.

An exemplary mechanical extension command "ESC c 1 n" is illustrated in command Table IV above, as being useful for instructing the printer as to which type of paper the desired line spacing or advancement value is to be set for. As before, the characters "c 1" (ASCII codes 63H and 31H), following the ESC (1BH) character indicate that the command is one designating a paper type for paper advancement. When this code is read by command interpreter 82, it is interpreted as a command directed to selecting the type of paper for which line advancement is to be set. This command structure is then followed by the command argument "n" to indicate which type of recording paper is being designated. If the parameter code for n is "01H" then the printer command code sent to the printer should be "1BH 63H 31H 01H."

While "n" can have a larger number of values so as to accommodate a variety of specialty papers and forms, it is typically limited in most applications to a few values, as in the case of the ESC c 3 and ESC c 4 commands discussed earlier. The code is expressed in hexadecimal code form, with 01H generally indicating continuous paper, 10H, slip paper, and 11H, both continuous and the slip paper. When such a code is set, the type of recording paper corresponding to the set code is selected. The default value is generally 11H, allowing both continuous and slip paper to be selected as the paper for which advancement values are set.

A flowchart of processing steps or operations used to control the printer after receiving a command for setting a specific advancement amount is shown in FIG. 9. In FIG. 9, a command is again received by command interpreter 82 in a step 120 and interpreted in a step 121. A determination is made in a step 122 as to whether or not the command includes information for setting a specific amount of line advancement (as in ESC 3 n). If it is determined in step 122 that the command does not include information for setting line advancement, then the command is executed in another fashion as another command type in a step 127. Otherwise, processing advances to a step 123.

A determination is made in step 123 as to whether or not continuous paper has been or is selected as the type of paper for which advancement is to be set by paper selector 84. If continuous paper has been selected, then the advancement value being received with the current command is stored in the continuous advance memory 85 in a step 124. Otherwise, a determination is made in step 125 as to whether or not slip paper is selected as the type of paper for which advancement is to be set. If slip paper has been selected, then the advancement value being received with the current command is stored in slip advance memory 86 in a step 126. Otherwise, it is assumed that an erroneous designation was detected in step 122, and processing for paper advancement setting terminates.

A flowchart illustrating operation of the printer when printing occurs on slip paper is shown in FIG. 10. As shown in FIG. 10, when slip paper is selected as the recording medium by execution of a command or operating switches in the printer, etc., the appropriate plungers are deenergized, causing the slip paper transfer mechanisms and the printer opening/closing mechanism to be opened, which prepares the printer to receive a sheet of slip paper in a step 130. The sheet of slip paper is then positioned at a form stop within printer mechanism 9 in a step 131. When the slip paper has been set in place, the slip paper detector provides a signal indicating the slip paper is present in a step 132. Detection of the paper status from status register 5 causes the printer controller to activate a plunger and close the lower slip paper transfer mechanism, to hold the slip paper in place in a step 133. The motor is then driven so that the slip paper is transferred along the desired paper path to a position adjacent the print head and past a front end the open printer mechanism, thereby completing the positioning of the slip paper in a step 134.

A second plunger is energized and the printer mechanism is closed so that the platen is set in a printable position in a step 135 for printing. The slip paper transfer mechanism is also closed simultaneously with the printer opening/closing mechanism and printing is executed by driving the print head in a step 136. Subsequently, in response to the advancement value set in slip advance memory 86, as determined in a step 137, motive force is applied only to the upper slip paper drive rollers in a step 138, so that only the slip paper is transferred and the printer executes a line advance operation, generally in concert with a carriage return.

The printing and line advance operations are repeated in a step 139 until all of the desired data or information is printed, or paper has run out, and when such repetition has been completed, the slip paper is discharged while transmitting the drive force of the motor only to the upper slip drive rollers but not to the continuous drive roller in a step 140. The plungers are then deenergized by the printer controller, so that the slip paper transfer mechanism is opened in a step 141, to thereby complete printing operations on the slip paper.

A flowchart illustrating operation of the printer when printing occurs on continuous type paper is shown in FIG. 11. In FIG. 11, a plunger is energized in a step 150 while continuous paper is held on a continuous paper drive roller and extends between the platen and the print head. This closes the printer opening/closing mechanism to prepare the printer for printing, and set the platen to a printable position. Then, based on a command, printing is started by operation of the print head in a step 151. Subsequently, in response to the advancement value set in continuous advance memory 85, as determined in a step 152, motive force is applied to the continuous drive roller by the power transmission mechanism in a step 153 so as to transfer the continuous type paper and execute a line advance operation. The printing and advance operations are repeated in a step 154, and when such repetition has been completed, the appropriate plunger is deenergized by the printer controller and the printer opening/closing mechanism is opened in a step 155.

As described above, the advancement setting procedure is completed by executing a pair of commands, namely a first command for selecting the media type and a second command for setting the line advancement amount. "ESC c1 n" is an example of the former command and "ESC 3 n" is an example of latter type of command. If the earlier examples for paper type and line spacing are combined to provide for a command indicating continuous paper (01H) and 1/6 inch spacing (40/240 or 28H), then the whole command and argument code sent to the printer, representing both paper type and advancement setting, should be "1BH 63H 31H 01H 1BH 33H 28H".

As set forth above, a printer controller operating according to the present invention provides for selection of the type of recording media or paper using a special printer control command so that line advancement can be set according to the type of recording paper used. As a result, printing can be executed once appropriate line advancement values are set for each type of recording paper if a printer user wishes to print on different types of recording paper having different line spacing, thereby reducing the burden on the part of the host computer in controlling the printer. In addition, the printing speed of the printer is increased, since the host computer does not have to transmit a control command for setting line spacing for each printing operation performed with a different type of recording paper.

As also described above, using the present invention, allows any desired combination of paper detectors for detecting the presence or absence of printer to be selected by control commands from the host computer. This makes it possible to interrupt and control printing based only on the status those paper detectors required at that time according to the print media being used. In addition, the status of one or more paper detectors can be reported to a host computer using only one signal line within a transmission line connected to the host computer, thus reducing costs and facilitating flexible control by the host computer. Moreover, since the paper detectors required to stop printing, and the paper detectors required to notify the host computer of paper status can be selected independently, control by the host computer can more sophisticated and expanded.

It should be noted that the above commands are exemplary of those useful for implementing the invention and not all of the commands listed in the tables above need to be implemented in a single printer or host computer. It may be preferable not to include all functions or commands depending on the specific application and less expensive interfaces can be constructed using smaller sub-sets of these commands. It is important, however, that commands that are implemented follow a plan of implementation such as presented here, so that incompatibilities do not occur across product lines or within systems as they are expanded. Therefore, an exemplary embodiment of the present invention is a printer that selects one or more commands from Tables IV, V, or VI for implementation such that other printers that select other commands for implementation from these same tables will be compatible. As a corollary, another embodiment of the present invention is a computer system host that selects one or more commands for implementation from the above tables so that other system hosts and printers that select other commands for implementation from the same tables are compatible within a single area of application.

In the alternative, the above interface and command protocol can also be easily applied to serial interfaces, which also enjoy widespread use within the computer and printer industry. Serial interfaces generally follow the EIA RS-232 interconnect specification for full-duplex communication, which is commonly encountered with computer peripherals such as "modems". In a serial communication scheme the "ESC" and subsequent command "characters" are converted into a serial bit stream before being sent to, or from, a printer or similar device.

While the present invention has been described in conjunction with several specific embodiments, it will be apparent to those skilled in the art that many further alternatives, modifications, and variations can be achieved in light of the forgoing description. Thus, the present invention described herein is intended to embrace all such alternatives, modifications, applications, and variations as may fall within the spirit and scope of the appended claims.

What is claimed is:

1. A printer control device connected to a printer for printing on multiple types of recording medium provided at different printer inputs and having medium transport means for independently transferring each of said multiple types of recording medium at said printer inputs through said printer, and connected to a host computer for controlling the operation of the printer, comprising:
    an interface having a plurality of signal lines connected to communicate with the host computer;
    a recording medium detector at each printer input providing an output indicative of a status of recording medium at said respective printer inputs;
    first selection means connected to receive control commands from the host computer for selecting only one or more specified detectors from among available of said recording medium detectors in response to host computer commands indicative of said specified recording medium detectors and to provide to said host computer with said status relative to only said specified recording medium detectors; and
    second selection means connected to receive control commands from the host computer for selecting only one or more specified recording medium from among available of said recording medium in response to host computer commands indicative of advancement values of specified recording medium transport through the printer by its associated transport means.

2. The printer control device of claim 1 further comprising print termination means for interrupting printing in response to a predetermined output from recording medium detectors selected by said first selection means.

3. The printer control device of claim 1 further comprising:
    advancement storage means connected to said medium transport means for storing print line advancement values corresponding to each of said types of recording medium, wherein said advancement values represent an amount by which each type of recording medium is to be transported by said medium transport means when advanced in the printer for a printing operation; and
    a command execution controller connected to said interface, medium transport means, and advancement storage means for receiving and decoding said control commands, for retrieving an advancement value corresponding to a selected recording medium type, and for activating said transport means for advancement of paper as specified by said host computer via said retrieved advancement value.

4. The printer control device of claim 1 wherein one of said interface signal lines comprises a single status communication line for communicating the presence or absence of recording medium in the printer to the host computer.

5. The printer control device of claim 4 wherein said interface comprises a standard Centronics parallel interface with eight data lines.

6. The printer control device of claim 1 comprising at least three medium detectors for three different types of recording medium comprising a journal entry paper, a receipt paper, and a slip paper.

7. A printer control device connected to a printer for printing on multiple types of recording medium provided at different printer inputs and having medium transport means for independently transferring each of said multiple types of recording medium at said printer inputs through said printer, and connected to a host computer for controlling the operation of the printer, comprising:
    an interface having a plurality of signal lines connected to communicate with the host computer;
    a recording medium detector at each printer input providing an output indicative of a status of recording medium at said respective printer inputs;
    selection means connected to receive control commands from the host computer for selecting only one or more of specified recording medium detectors from among available of said recording medium detectors in response to host computer commands indicative of said specified recording medium and to provide to said host computer with said status relative to only said specified recording medium;
    said selection means for receiving and responding to a first command to select said specified recording medium detectors for output of status information through said interface to said host computer and respond to a second, independent, command to select from among said specified recording medium detectors those for which status output is used to interrupt printing.

8. The printer control device of claim 7 further comprising status means for detecting and transmitting an operating state of said specified recording medium detectors to the host computer.

9. The printer control device of claim 8 wherein said status means comprises an addressable latch.

10. The printer control device of claim 8 further comprising combining means connected in series between said status means and said recording medium detectors for receiving recording medium detector outputs and providing a preselected logical combination thereof to provide a single status output.

11. The printer control device of claim 4 wherein said selection means receives and responds to a preselected character string as a command to select predetermined outputs of said recording medium detectors to indicate presence or absence of recording medium at said predetermined outputs, and to decode a preselected amount of data following the command as designating one or more of said recording medium detectors to be specified for determination of said status.

12. A method for controlling a printer for printing on at least two types of recording medium in response to commands and data received from a host computer over an interface, comprising the steps of:
    providing a recording medium detector for each of the types of recording medium to indicate a status of respective recording medium being either present or absent in the printer, selecting one or more of said recording medium detectors via a first command from the host computer constituting a first detector group;

monitoring the outputs of said first detector group to determine a presence or absence of recording medium via its associated detector;

disabling initiation of a printing operation by the printer if monitoring indicates an absence of recording medium via said first detector group outputs;

enabling initiation of a printing operation by the printer if monitoring indicates a presence of recording medium via said first detector group outputs;

selecting one or more of said recording medium detectors via a second command from the host computer constituting a second detector group;

monitoring the outputs of said second detector group to determine an absence of recording medium via its associated detector; and interrupting a printing operation in progress by the printer if monitoring indicates an absence of recording medium via said second detector group outputs.

13. The method of claim 12 further comprising the step of storing detected operating states of recording medium detectors in a host computer addressable status memory element.

14. The method of claim 12 further comprising the step of combining first and second detector group outputs using a preselected logical combination pattern so as to provide a single status output for the host computer.

15. A printer control device for a printer for printing on at least two types of recording medium at different printer inputs in response to commands received from a host computer, comprising:

an interface for receiving control commands from the host computer;

medium transport means for independently transporting each of said at least two types of recording media from said printer inputs through said printer;

advancement storage means connected to said medium transport means for storing line advancement values corresponding to each of said types of recording medium, wherein said advancement values represent an amount by which each type of recording medium is to be transported by said transport means when said medium is advanced in the printer for a printing operation; and a command execution controller connected to said interface, medium transfer means, and advancement storage means for receiving and decoding said control commands, for retrieving an advancement value corresponding to a selected recording medium type, and for activating said transport means for advancement of said selected recording medium type as specified by said host computer via said retrieved advancement value.

16. The printer control device of claim 15 wherein said command execution controller comprises a command interpreter for decoding host computer commands and a recording medium selection means for selecting one of said types of recording medium based upon said interpreted control commands.

17. The printer control device of claim 15 wherein said advancement storage means comprises a plurality of separate media advancement memories, one for each type of recording media to be used by said printer.

18. A method for controlling a printer for printing on at least two types of recording medium in response to commands received from a host computer and including medium transport means to move a selected recording medium in the printer for a printing operation, comprising the steps of:

receiving and interpreting control commands from said host computer relating to recording medium type and its line advancement value for recording medium advancement by said medium transport means through the printer a predetermined incremental medium advancement spacing;

selecting one of said types of recording medium to be used in a printing operation based upon the interpreted control commands;

storing the advancement value based upon the interpreted control commands in advancement storage means relative to the selected one of said types of recording medium, retrieving the line advancement value from the advancement storage means corresponding to the selected one of said types of recording medium; and controlling the advancement of the selected one of said types of recording medium via the medium transport means in the printer for printing on successive lines of the selected recording medium at the predetermined medium advancement spacing.

19. A method of operating a printer through a host computer wherein the printer is provided with two or more types of printing medium sources provided at different printer inputs for different printing applications comprising the printing of lines of information and a detector associated with each of said different printer inputs for determining if its respective printing medium source status is present or empty and indicating that status through a single status line to the host computer, comprising the steps of:

selecting one or more detectors whose output is to be checked for status, setting a first detector flag for each selected detector to be observed by the host computer, setting a second detector flag for each selected detector where a printing operation is to be interrupted if a printing medium source status is indicative of empty, periodically checking the printing medium source status for each detector whose first flag is set, observing the output of the checked detector whose first flag is set as to the printing medium source status, combining the status outputs for transfer via the single status line to the host computer indicative of the printing medium source status of each detector whose first flag is set, and interrupting the printing operation for each detector whose second flag is set if its printing medium source status is indicative of empty.

20. The method of operating a printer of claim 19 including the step of interrupting the printing operation for each detector whose second flag is set if its printing medium source status is indicative of empty after completion of printing of a current line of information in progress.

21. The method of operating a printer of claim 19 including the steps of setting in a memory a value representative of print line advancement desired for each of the printing medium sources, selecting from the memory an appropriate print line advancement value in response to selection by the host computer of a specified printing medium source whereby a proper print line advancement value is automatically set for each printing operation performed with a different type of printing medium source without further indication of set print line advancement values from the host computer.

22. A method of operating a printer through a host computer wherein the printer is provided with two or more types of printing medium sources provided at different printer inputs for different printing applications and with printing medium transport means to transport a recording medium from a corresponding printing medium source through a path in the printer past a print head, comprising the steps of:

receiving control commands from the host computer indicative of print line advancement values, storing in an advance memory the print line advancement value for each printing medium source type, selecting a printing medium source type in preparation of a printing operation on a selected medium, retrieving a print line advancement value from the advance memory for the selected printing medium source type, and operating the printer printing medium transport means to transport the selected recording medium past the print head at a line advance rate commensurate with the retrieved print line advancement value.

* * * * *

UNITED STATES PATENT AND TRADEMARK OFFICE
CERTIFICATE OF CORRECTION

PATENT NO. : 5,398,305
DATED : March 14, 1995
INVENTOR(S) : Kazunari Yawata, et al.

It is certified that error appears in the above-indentified patent and that said Letters Patent is hereby corrected as shown below:

On the title page:

ABSTRACT,

Line 4, insert --, such as continuous tape, document insertion, and validation.-- between "paper" and ". Several detectors".

Line 12, insert --, as well as for output polling in relation to the choice of paper-- between "line" and ". Specific detector".

Line 22, insert --Once the paper type and line advancement values are set,-- between "the printer controller." and "The printer controller".

Line 22, change "The" (second occurrence) to --the--.

Line 26, insert --As a result, proper, variable rate, line advancement can be executed automatically during printing for changing types of paper, once values are set for each type of recording paper, thereby reducing the burden on the host computer in controlling the printer and effectively increasing printing speed.-- after "values during printing operations.".

UNITED STATES PATENT AND TRADEMARK OFFICE
CERTIFICATE OF CORRECTION

PATENT NO.   : 5,398,305
DATED        : March 14, 1995
INVENTOR(S)  : Kazunari Yawata, et al.

It is certified that error appears in the above-indentified patent and that said Letters Patent is hereby corrected as shown below:

Claims,

Claim 6, Line 2, after "three" insert --recording--.

Claim 7, Line 20, after "specified recording medium" insert --detectors--.

Claim 7, Line 22, after "specified recording medium" insert --detectors--.

Claim 11, Line 1, change "claim 4" to --claim 7--.

Signed and Sealed this

Seventh Day of May, 1996

*Attest:*

BRUCE LEHMAN

*Attesting Officer*    Commissioner of Patents and Trademarks